United States Patent
Peters

(10) Patent No.: US 6,598,556 B1
(45) Date of Patent: Jul. 29, 2003

(54) AERODYNAMIC WIND RIDING ANTENNA ORNAMENT

(75) Inventor: Ron Peters, Long Beach, CA (US)

(73) Assignee: Jim McCafferty Productions, Inc., Santa Ana, CA (US)

( * ) Notice: Subject to any disclaimer, the term of this patent is extended or adjusted under 35 U.S.C. 154(b) by 0 days.

(21) Appl. No.: 10/027,529

(22) Filed: Dec. 26, 2001

(51) Int. Cl.[7] ................................................. B60Q 1/26
(52) U.S. Cl. ...................... 116/50; 116/35 R; 116/28 R; 116/44; 116/42; 116/43; 40/591; 40/592; 40/412; 40/413; 248/62
(58) Field of Search ................................. 116/35 R, 44, 116/50, 28 R, 42, 43; 40/591, 592, 412, 413; 248/62, 74.3, 132, 157, 219.3, 569, 602, 230.1

(56) References Cited

U.S. PATENT DOCUMENTS

| | | | | |
|---|---|---|---|---|
| 1,441,261 A | * | 1/1923 | Ackman, Jr. .................. | 40/413 |
| 1,524,313 A | * | 1/1925 | Rumohr ........................ | 40/413 |
| 1,531,566 A | * | 3/1925 | Moiseve et al. .............. | 40/413 |
| 1,927,399 A | * | 9/1933 | Godman ....................... | 40/413 |
| 5,027,539 A | * | 7/1991 | Orsini .......................... | 40/413 |
| 6,059,241 A | * | 5/2000 | Martone ................... | 248/230.1 |
| 6,063,459 A | * | 5/2000 | Velte ............................. | 428/31 |
| 6,192,708 B1 | * | 2/2001 | Mitchell ...................... | 63/15.6 |
| 6,247,423 B1 | * | 6/2001 | Ingram et al. ............ | 116/28 R |

* cited by examiner

Primary Examiner—Diego Gutierrez
Assistant Examiner—Amanda J Hoolahan
(74) Attorney, Agent, or Firm—Allan Grant; The Walker Law Firm

(57) ABSTRACT

The present invention is an aerodynamic wind riding antenna ornament comprising a main body adapted to be rotatably and slidably attached to an antenna mast. The main body has an aerodynamic lifting surface to harness airflow from the movement of a vehicle to move the ornament up and down the antenna mast. The main body also has an aperture of sufficient size to allow for the device to freely slide up and down an antenna mast. Retaining means is removably coupled to the aerodynamic lifting surface near the aperture to prevent the aerodynamic wind riding antenna ornament from sliding off the top of the antenna. The retaining means can comprise a snap-on clip, spring-like clip, or a portion of an ornamental figure removably coupled to the main body. Optional stopper clamps can be removably coupled to the antenna to restrict where the device travels on the antenna. The device can have optically perceived indicia to increase the appearance.

11 Claims, 3 Drawing Sheets

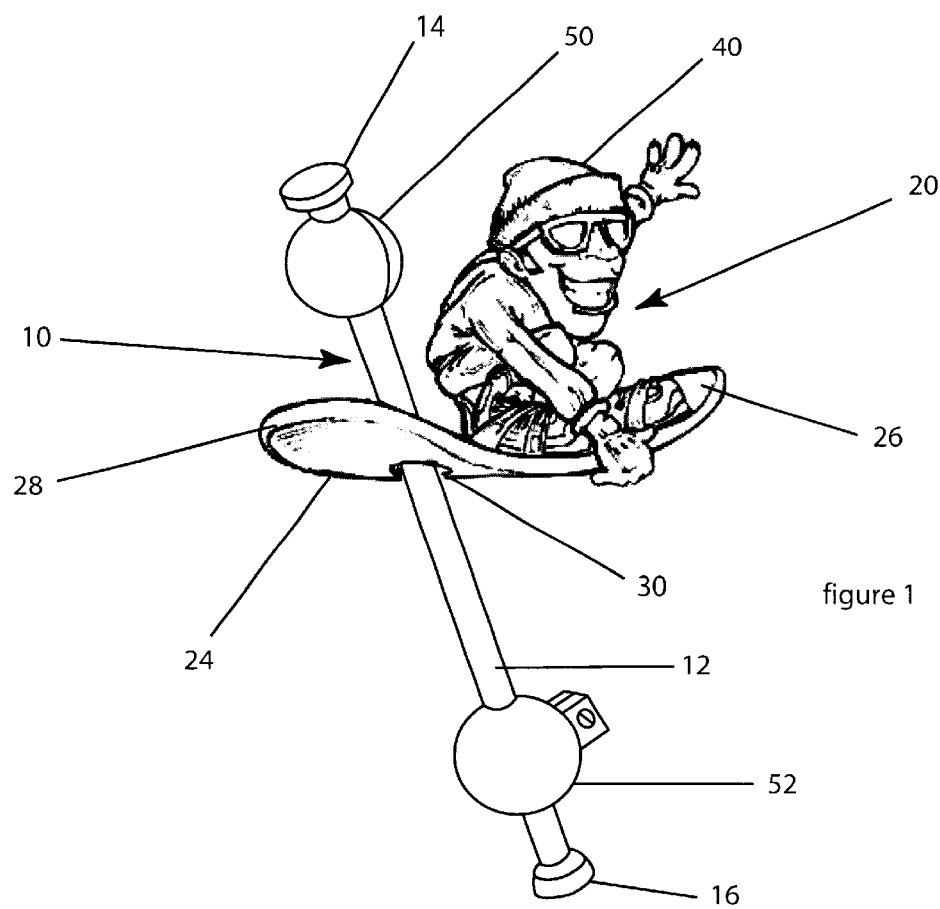
figure 1
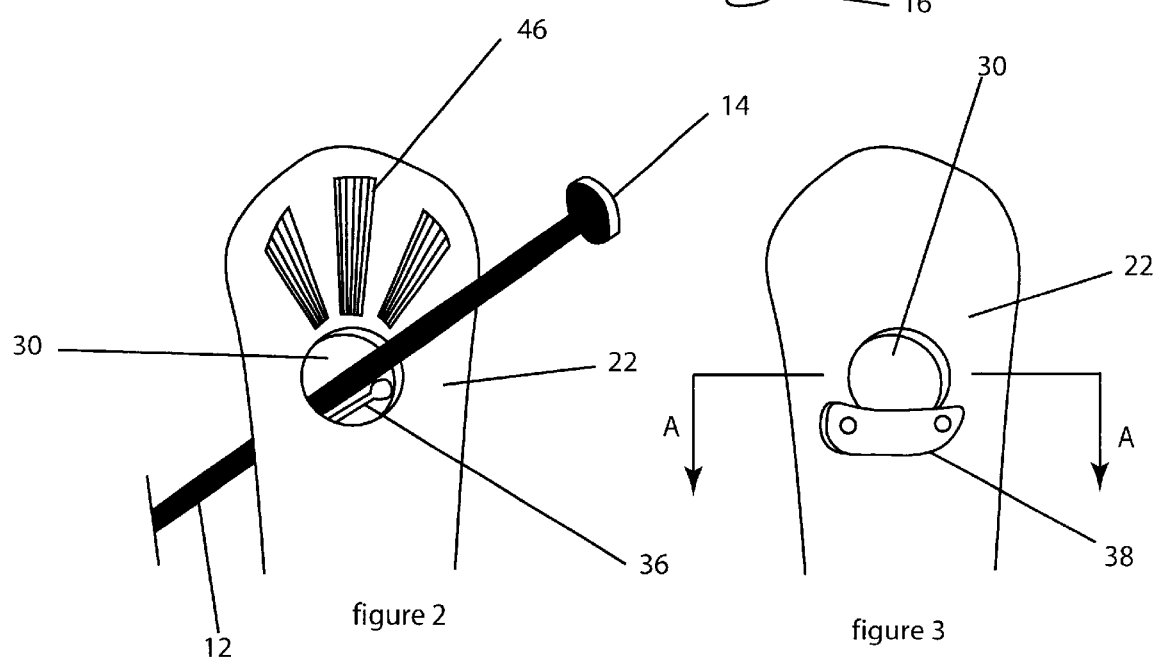
figure 2
figure 3

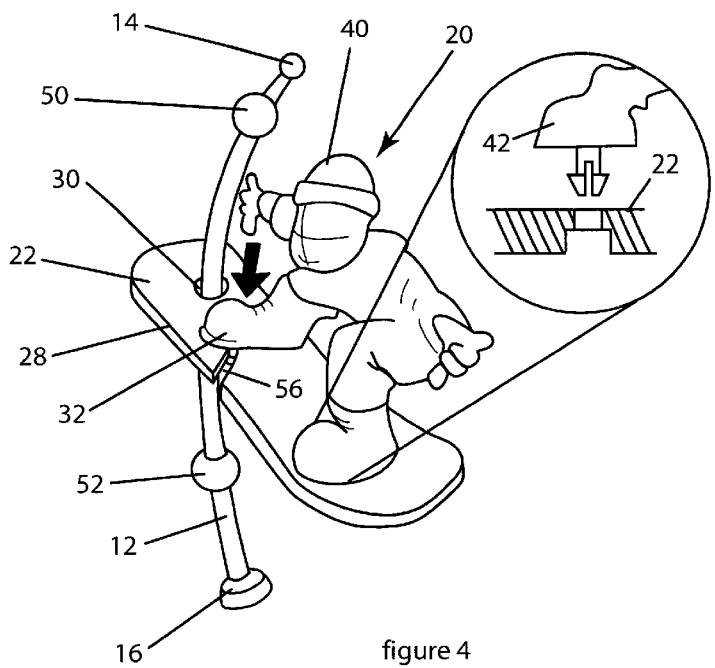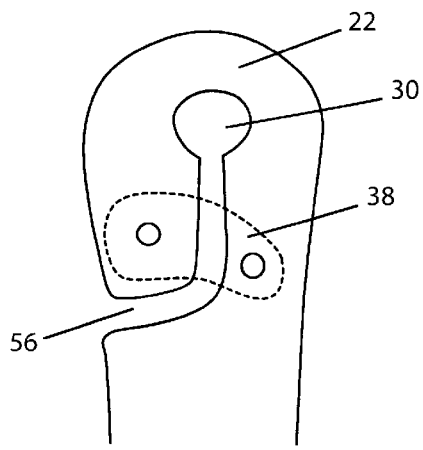
figure 4
figure 5
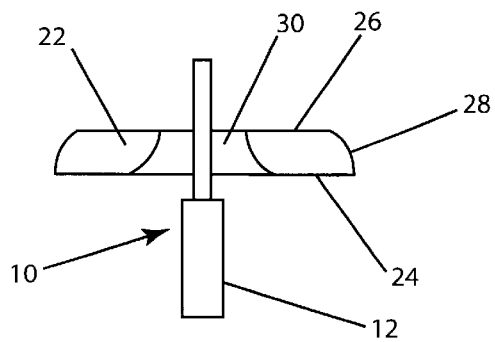
figure 6

AERODYNAMIC WIND RIDING ANTENNA ORNAMENT

FIELD OF THE INVENTION

The present invention relates generally to antenna ornaments and more particularly to an aerodynamic antenna ornament having airfoil characteristics to harness airflow from the movement of a vehicle to move the ornament up and down the antenna.

BACKGROUND OF THE INVENTION

Antenna ornaments have many different uses. They allow people to show support for country, schools, sporting teams, to indicate participation in an activity and to personalize their vehicle by enhancing its stylistic potential. Antenna ornaments can also provide a means for more easily finding or "spotting" a particular vehicle when it is parked in a crowded lot. Additionally, antenna ornaments can be used to indicate participation in a caravan such as a funeral procession. More recently many antenna ornaments have been designed for purposes of entertainment and display, such as the recently popular Jack-in-the-Box Jack Heads or Wienerschnitzel Hot Dog Character.

The prior art devices comprise fixed position ornaments that remain at one location on an antenna once attached. The prior art devices commonly comprise a display portion bearing various optically perceived indicia and an attachment portion for securing the ornament to the antenna. The prior art discloses various two and three-dimensional antenna ornaments that employ various mechanisms to secure the display portion to an antenna, such as hooks, straps, slots, and clamps. Various prior art antenna ornaments and attachment devices are disclosed in the following United States patents:

U.S. Pat. No. 4,989,536 Antenna Clamp by Liming et al., issued Feb. 5, 1991;
U.S. Pat. No. 4,960,067 Antenna Signal Device by Currie, issued Oct. 2, 1990;
U.S. Pat. No. 4,875,431 Wind Deflector by Dobosz, issued Oct. 24, 1989;
U.S. Pat. No. 4,526,820 Ornamental Marker for Vehicle Antennas by Haas, issued Jul. 2, 1985;
U.S. Pat. No. 3,526,050 Emblematic Article or Medallion by Weller, issued Sep. 1, 1970;
U.S. Pat. No. 5,665,438 Antenna Accessory for Vehicle Identification by Lee et al., issued Sep. 9, 1997;
U.S. Pat. No. 2,764,122 Flag and Flagstaff Assembly by Irvin, issued Sep. 25, 1956;
U.S. Pat. No. 6,063,459 Antenna Ornament by Velte, issued May 16, 2000;
U.S. Pat. No. 5,636,588 Antenna Mounted Identification Marker by Keller et al., issued Jun. 10, 1997;
U.S. Pat. No. 4,972,795 Antenna Marker Device by Mace, issued Nov. 27, 1990;
U.S. Pat. No. 5,572,225 Antenna Mounting Device by McCarthy, issued Nov. 5, 1996;
U.S. Pat. No. 6,197,390 B1 Multi-Purpose Vehicle Ornament by LaVite, issued Mar. 6, 2001;
U.S. Pat. No. Des. 427,179 Automobile Antenna Ornament by Gamble, Jr. et al., issued Jun. 27, 2000.

A problem associated with the prior art antenna ornaments such as banners and pennants is that in order to be properly seen or read they require wind to open them up or expand them to their fully opened displayable position to allow them to be properly seen. However, excessive wind can cause such banners or pennants to flap erratically making them difficult to be read by the casual observer. Furthermore, vehicles are often parked or stopped at lights and stop signs, which renders banners and pennants collapsed and illegible. Another problem associated with the prior art antenna ornaments is they do not move up and down the antenna but are affixed to one location on an antenna.

Accordingly, there is a substantial need in the art for an improved antenna ornament that has an aerodynamic lifting surface to create an aerodynamic wind riding antenna ornament that uses the air currents created by a moving vehicle to allow the device to travel up and down an antenna. Along with overcoming the problems noted above, the present invention provides improved visibility, attractiveness, eye-catching movement, flight characteristics, ease of assembly and attachment to an antenna, and can be inexpensively manufactured.

SUMMARY OF THE INVENTION

The present invention specifically addresses and alleviates the above deficiencies associated with the prior art. In this regard, the present invention comprises an improved antenna ornament that is always in the display position and has airfoil characteristics to harness airflow to move up and down an antenna relative to the airflow and corresponding speed of a vehicle that the antenna is attached to.

The aerodynamic wind riding antenna ornament travels up and down the antenna or similar elongated structure of vehicles such as automobiles, boats, motorcycles, scooters, bicycles, tricycles and big wheels. The aerodynamic wind riding antenna ornament provides an eye-catching effect by travelling up and down an antenna when wind pushes against the aerodynamic lifting surface. As the wind speed increases the antenna ornament travels up the antenna and will simulate the movement of a snowboarder, surfer, airplane or other action figure. Once the ornament has traveled up the antenna when the wind speed is decreased the ornament will descend down the antenna and again simulate the movement of various action figures. When a vehicle is stationary, such as a parked car, the ornament can provide a means for easily identifying and finding one's vehicle when parked among other vehicles such as in a crowded parking lot.

It is an object of the present invention to be removably, rotatably and slidably coupled to an antenna to allow the device to travel up and down the antenna. In one embodiment of the present invention, the aerodynamic wind riding antenna ornament is attached to an antenna mast by having a main body with an aperture of sufficient size to slide the device over the antenna tip and attach retaining means near the aperture to reduce the aperture size to a size slightly smaller than the antenna tip but larger than the antenna mast to prevent the ornament from sliding off the top of the antenna while allowing the device to freely travel up and down the antenna mast.

In another embodiment of the present invention the aerodynamic wind riding antenna ornament is removably, rotatably and slidably attached to an antenna mast by having a main body which has a slot leading to the aperture to allow the antenna mast to be directed through the slot to the aperture. Retaining means is attached to the slot near the aperture to retain the antenna mast within the aperture. The retaining means can comprise (1) a spring like clip that allows the aperture width to open to a size larger than the antenna mast and then returns to a closed position maintaining the aperture size smaller than the antenna tip but larger than the antenna mast; (2) a snap on clip that removably snaps onto the main body at a position that reduces the aperture to a size smaller than the antenna tip and larger than the antenna mast; or (3) an ornamental figure removably coupled to the main body, wherein a portion of the ornamental figure is adapted to reduce the aperture width to a size smaller than the width of an enlarged antenna tip and larger than the antenna mast width.

In yet another embodiment of the present invention the aerodynamic wind riding antenna ornament is removably, rotatably and slidably attached to an antenna mast by a connector removably coupled to the main body. The connector can be substantially U-shaped to create an enclosed aperture when coupled to the main body. The aperture being slightly larger than the antenna mast and smaller than the antenna tip to prevent the device from sliding off the top of the antenna.

Another object of the present invention is to provide a device that can freely travel down telescoping antennas that have segments with larger mast diameters at the bottom of the antenna than at the top of the antenna. To allow the device to freely travel down telescoping antennas, the aperture is larger at the bottom and smaller at the top. That is the top of the aperture is larger than the antenna mast segments and smaller than the antenna tip and the bottom of the aperture is larger than the antenna mast segments and the antenna tip. The aperture starts at the top and either curves or angles to the larger bottom.

In another embodiment a frustum-shaped tube is coupled to the bottom of the device aligned with the aperture to allow the device to freely travel down telescoping antennas. The frustum-shaped tube has a smaller width at the aperture and increases in size at the bottom of the tube to prevent the device from getting caught up or stuck at the junction of two antenna mast segments of a telescoping antenna.

Another object of the present invention is to allow the device to function properly on antennas where the antenna tip is too small relative to the antenna mast to allow the device to freely travel up and down the antenna. In another embodiment a separate clamp is attached to the antenna near the antenna tip to prevent the device from sliding or flying off the top of the antenna. Additionally, a second clamp can be attached to the antenna mast below the device to restrict the distance along the antenna mast the device can travel. The clamp or clamps can be folding clamshell like clamps that fold around the antenna mast and snap closed to be removably attached to the antenna mast. The clamps can also employ screws or adjustable closing means to removably attach to the antenna mast.

It is a further object of the present invention to have optically perceived indicia on at least a portion of the main body and/or on the ornamental figure, which can be used for advertisement or displaying promotional information. The optically perceived indicia can be eye-catching indicia that generates an image when the antenna ornament is flying through the air.

Other features and advantages of the invention will become apparent from the following detailed description, taken in conjunction with the accompanying drawings, which illustrate, by way of example, various features of embodiments of the invention.

BRIEF DESCRIPTION OF THE DRAWINGS

These as well as other features of the present invention will become more apparent upon reference to the accompanying drawings wherein like numerals designate corresponding parts in the several figures summarized as follows:

FIG. 1 is a perspective view of the aerodynamic wind riding antenna ornament.

FIG. 2 is an enlarged partial view of the main body of the aerodynamic wind riding antenna ornament detailing the spring-like clip aperture size reducer.

FIG. 3 is an enlarged partial view of the main body of the aerodynamic wind riding antenna ornament detailing the snap-on clip aperture size reducer.

FIG. 4 is an enlarged partial view of the main body of the aerodynamic wind riding antenna ornament detailing the use of an ornamental figure for the aperture size reducer.

FIG. 5 is an enlarged partial view of the main body of the aerodynamic wind riding antenna ornament detailing a slot and aperture configuration of the retaining means.

FIG. 6 is an enlarged partial cross-sectional view along lines A—A of FIG. 3, showing a portion of the main body of the aerodynamic wind riding antenna ornament detailing the aperture with a larger width at the bottom surface of the main body and a smaller width at the top surface of the main body.

DETAILED DESCRIPTION OF THE PREFERRED EMBODIMENTS

Figure 7:
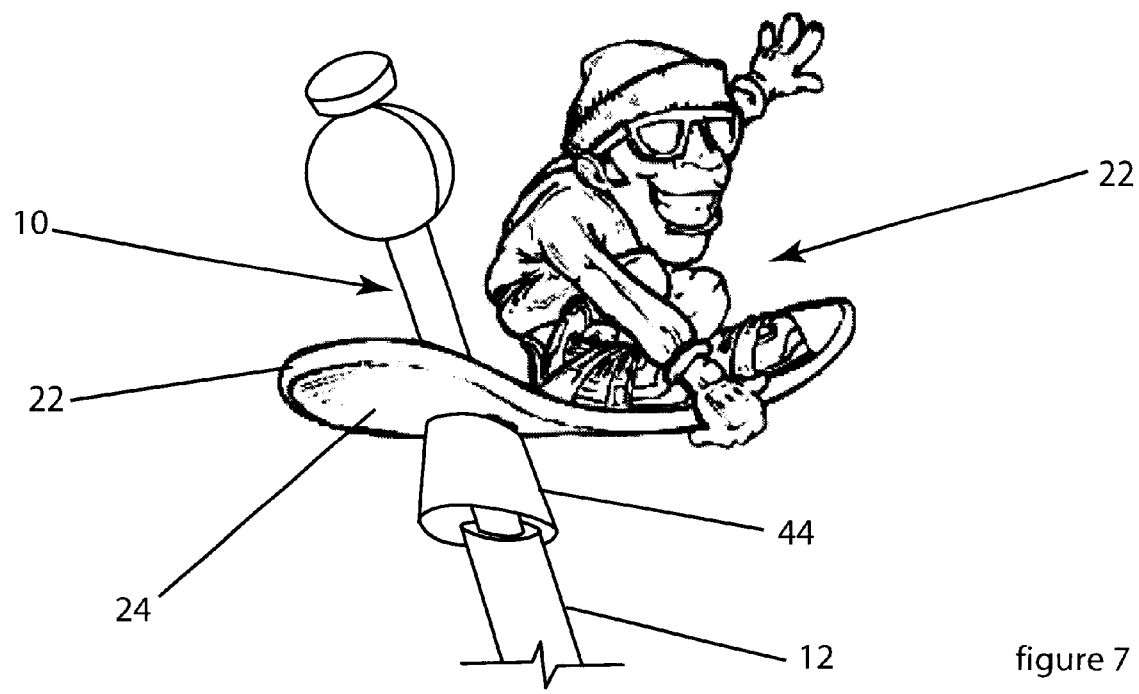
FIG. 7 is an perspective view of the aerodynamic wind riding antenna ornament detailing the antenna guide.

The following detailed description and accompanying drawings are provided for purposes of illustrating and describing presently preferred embodiments of the present invention and are not intended to limit the scope of the invention in anyway. It will be understood that various changes in the details, materials, arrangements of parts or operational conditions which have been herein described and illustrated in order to explain the nature of the invention may be made by those skilled in the art within the principles and the scope of the invention.

Referring now to the drawings, and more particularly to FIG. 1, there is illustrated an aerodynamic wind riding antenna ornament 20 having a main body 22 with a main body bottom surface 24 and main body top surface 26 that is removably attached to an antenna 10. The main body 22 has at least one aerodynamic lifting surface 28 that has airfoil characteristics to harness airflow from the movement of a vehicle such as an automobile, boat, motorcycle, scooter, bicycle, tricycle, big wheel, or like vehicle having an antenna or similar slender elongated structure. The aerodynamic wind riding antenna ornament 20 provides an eye-catching effect by travelling up and down the antenna 10 when wind pushes against the aerodynamic lifting surface 28. As the wind speed increases the aerodynamic wind riding antenna ornament 20 travels up the antenna and will simulate the movement of a snowboarder, surfer, airplane or other action figure "flying" or "catching air".

To enhance the attractiveness of the aerodynamic wind riding antenna ornament 20, either the main body 22 or the ornamental FIG. 40 can be in the image of human figures, animal figures, cartoon figures, flying figures, a helmet or hat with a team logo on it, objects such as a pyramids, igloo, cones, snowboards, surf boards, skate boards, or monoskies, slogans, and trademarks. Additionally, it is understood that the aerodynamic lifting surface 28 can be made in the form of various different objects such as but not limited to a boomerang, flying saucer, UFO, pyramid, igloo, cone, glider, sail, wing, parachute, cape of a superhero from superman or other characters, helmet, hat, a pair of skies, a board such as a snow board, surf board, skate board, or skis, and numerous other shapes and images so as to provide airfoil characteristics.

The device has various configurations to allow for removable attachment to various types of antennas. Some such antennas 10 have an antenna mast 12, an antenna tip 14, and an antenna base 16. Additionally, some antennas have telescoping segments that typically have larger diameter base segments than top segments. In the embodiment shown in FIG. 1, the aerodynamic wind riding antenna ornament 20 is removably attached to the antenna mast 12 to allow for rotation and sliding up and down the antenna mast by sliding the antenna 10 through an aperture 30 in the main body 22. Once the antenna 10 is within the aperture 30, an aperture size reducer 34 limits the size of the aperture to a size slightly larger than the antenna mast 12 and slightly smaller than the antenna tip 14 to prevent the device from flying off the top of the antenna 10.

Further shown in FIG. 1 are optional stopper clamps 48, which can be removably coupled to the antenna mast 12 to limit the upper and lower position on the antenna mast that the aerodynamic wind riding antenna ornament 20 can travel. A first stopper clamp 50 is removably coupled to the antenna mast 12 at a location between the aerodynamic wind riding antenna ornament 20 and the antenna tip 14, and a second stopper clamp 52 is removably coupled to the antenna mast 12 at a location between the aerodynamic wind riding antenna ornament 20 and the antenna base 16. The use of one stopper clamp 48 can also be used at the top of an antenna 10 to prevent the aerodynamic wind riding antenna ornament 20 from flying off the top of the antenna 10, thereby eliminating the need for a retaining means 32 as long as the stopper clamp 48 is larger in size than the aperture 30.

The stopper clamps 50 and 52 can comprise two halves that fold around an antenna mast 12 to retain a portion of the antenna mast therein. The two halves of the stopper clamp 48 are coupled together by an interlocking mechanism that can be a screw, bolt, clamp, pin, latch, hook, or other similar coupling device that a person skilled in the art would consider equivalent.

FIG. 2 shows one embodiment of the aerodynamic wind riding antenna ornament 20 with retaining means 32 being an aperture size reducer 34 that is a spring-like clip 36 that allows the aperture 30 to open to a size larger than the antenna tip 14 and then returns to a closed position maintaining the aperture size smaller than the antenna tip 14 and larger than the antenna mast 12. Additionally, optically perceived indicia 46 can be placed on various portions of the main body 22 as shown and can include advertising and promotional information. The aperture 30 can be located on the main body 22 of the aerodynamic wind riding antenna ornament 20 to allow for spinning to work in conjunction with optically perceived spin-indicia to produce an eye-catching effect.

FIG. 3 shows another embodiment of the aerodynamic wind riding antenna ornament 20 having an aperture size reducer 34 that is a snap-on clip 38 that removably snaps onto the main body to reduce the size of the aperture 30 to a size smaller than the antenna tip 14 and larger than the antenna mast.

The preferred embodiment as shown in FIG. 4 includes a first stopper clamp 50 located between the aerodynamic wind riding antenna ornament 20 and the antenna tip 14, a second stopper clamp 52 located between the aerodynamic wind riding antenna ornament 20 and the antenna base 16. The main body 22 has aerodynamic lifting surfaces 28 and a slot 56 extending from the aperture 30 to the side of the main body 22. The main body is made of a material that can be flexed to allow the antenna mast 12 to be slid into the aperture 30 through the slot 56. A portion 42 of an ornamental FIG. 40 that is removably coupled to the main body acts as the retaining means 32 similar to the snap-on clip 38 shown in FIG. 3.

FIG. 5 shows an enlarged partial view of the main body 22 having a slot 56 sized slightly larger than the antenna mast 12 and extending from the aperture 30 to the side of the main body to allow the antenna mast to be positioned into the aperture through the slot 56. Retaining means 32, shown as a snap-on clip 38, is removably coupled to the main body 22 near the aperture 30 to prevent the antenna 10 from escaping out through the slot 56. In another embodiment more readily seen in FIG. 4, the retaining means 32 is actually a portion of the ornamental FIG. 40 that is removably coupled to the main body 22 near the aperture 30 to close off the slot.

FIG. 6 shows an enlarged cross-sectional view of a portion of the main body 22 along line A—A of FIG. 2 showing the aperture 30 having a larger width at the main body bottom surface 24 than at the main body top surface 26 to allow the aerodynamic wind riding antenna ornament 20 to freely travel down an antenna 10 that has a telescoping antenna mast 12.

FIG. 7 is an enlarged partial perspective view of a portion of the main body 22 of the aerodynamic wind riding antenna ornament 20 detailing the antenna guide 44, which is a substantially frustum-shaped tube having a smaller width where the antenna guide 44 is removably coupled to the main body bottom surface 24 and the tube diameter expands to a larger diameter to allow the aerodynamic wind riding antenna ornament 20 to freely travel down an antenna 10 that has a telescoping antenna mast 12.

Figure 8:
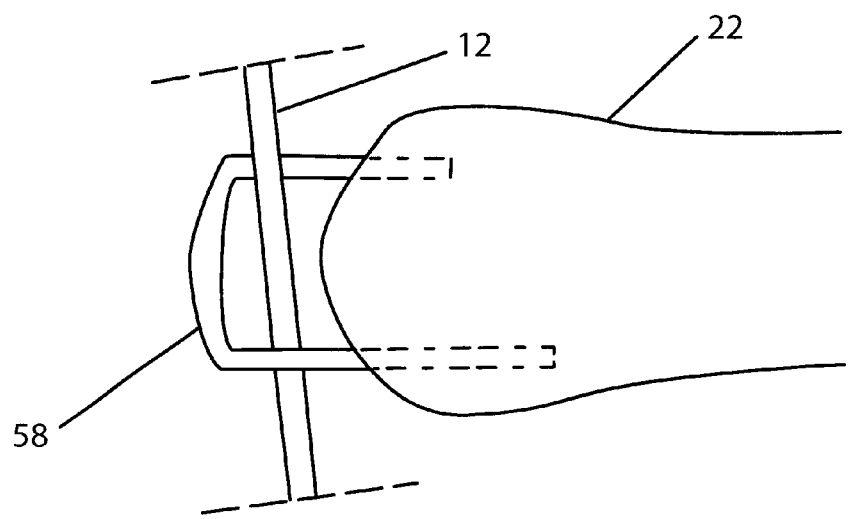
FIG. 8 is an enlarged partial view of a portion of the main body of the aerodynamic wind riding antenna ornament showing the connector for attachment to an antenna.

FIG. 8 is an enlarged partial view of an embodiment showing a portion of the main body 22 of the aerodynamic wind riding antenna ornament 20 having a connector 58 for removable attachment to an antenna to allow the aerodynamic wind riding antenna ornament 20 to rotate and slide up and down the antenna mast 12.

It should be understood that more than one aerodynamic wind riding antenna ornament can be removably coupled to an antenna. Numerous stopper clamps 48 can be placed at various positions on an antenna mast to provide different regions for multiple aerodynamic wind riding antenna ornaments to travel up and down segments of an antenna. For example, one antenna ornament can be located towards the bottom third of the antenna and another ornament may be located towards the top third of the antenna and another may be located in the middle third of the antenna as long as there is a clamp separating them in the designated area. It should further be understood that numerous ornaments might be place on an antenna without the use of clamps to separate the ornaments thereby allowing the aerodynamic wind riding antenna ornaments to collide into one another or move up and down in tandem. The ability to put multiple ornaments on an antenna allows an individual to enhance the individuality, distinctiveness, and style of an antenna.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive; the scope of the invention being indicated by the appended claims, rather than the foregoing description, and all changes which come within the meaning and range of equivalency of the claims are therefore intended to be embraced therein.

What is claimed is:

1. An aerodynamic wind riding antenna ornament comprising:

a main body adapted to be rotatably and slidably attached to an antenna mast, the main body having at least one aerodynamic lifting surface for making use of the air currents through which the main body moves to lift the main body from a position proximate the antenna base to a position proximate the antenna tip;

the main body having an aperture sized larger than the antenna mast and smaller than the antenna tip;

the main body having a slot sized slightly larger than the antenna mast and extending from the aperture to an end or side of the main body to allow the antenna mast to be positioned into the aperture through said slot; and retaining means removably coupled to the aerodynamic lifting surface near where the slot meets the aperture to prevent the antenna mast from sliding out of the aperture through the slot.

2. The aerodynamic wind riding antenna ornament of claim 1, wherein the retaining means comprises a spring-like clip removably coupled to the main body and extending across the slot near the aperture to prevent the antenna mast from coming out of the aperture.

3. The aerodynamic wind riding antenna ornament of claim 1, wherein the retaining means comprises a snap-on clip removably coupled to the main body and extending across the slot near the aperture to prevent the antenna mast from coming out of the aperture.

4. The aerodynamic wind riding antenna ornament of claim 1, further comprising an ornamental figure removably coupled to the main body, wherein the retaining means is a portion of the ornamental figure extends across the slot near the aperture to prevent the antenna mast from coming out of the aperture.

5. The aerodynamic wind riding antenna ornament of claim 4, wherein at least a portion of the ornamental figure has optically perceived indicia thereon.

6. The aerodynamic wind riding antenna ornament of claim 1, wherein the aperture has a larger width at the bottom surface of the main body and a smaller width at the top surface of the main body to allow the aerodynamic antenna ornament to freely travel down telescoping antennas that increase in antenna mast diameter from the antenna top to the antenna base.

7. The aerodynamic wind riding antenna ornament of claim 1, further comprising an antenna guide removably coupled to the bottom surface of the main body near the aperture, the antenna guide comprising a substantially frustum-shaped tube having a smaller width at the aperture and increasing in size to allow the aerodynamic antenna ornament to freely travel down telescoping type antennas that have larger sections at the antenna base.

8. The aerodynamic wind riding antenna ornament of claim 1, wherein at least a portion of the main body has optically perceived indicia thereon.

9. The aerodynamic wind riding antenna ornament of claim 1, further comprising:

at least one stopper clamp removably attached to the antenna mast between the aerodynamic wind riding antenna ornament and either the antenna tip or the antenna base to limit the distance along the antenna mast the aerodynamic wind riding antenna ornament can travel.

10. The aerodynamic wind riding antenna ornament of claim 9, wherein the at least one stopper clamp comprises:

a first stopper clamp removably coupled to the antenna mast between the aerodynamic wind riding antenna ornament and the antenna tip, and a second stopper clamp removably coupled to the antenna mast between the aerodynamic wind riding antenna ornament and the antenna base, said first and second stopper clamps for limiting the distance along the antenna mast the aerodynamic antenna ornament can travel.

11. The aerodynamic wind riding antenna ornament of claim 9, wherein the at least one stopper clamp comprises:

a folding clamp that has two mirrored portions removably attached to each other; said folding clamp mirrored portions having an aperture for adjustably housing a portion of the antenna mast therein.

* * * * *